United States Patent [19]

Groat

[11] Patent Number: 4,895,391
[45] Date of Patent: Jan. 23, 1990

[54] AUTOMOTIVE STEERING DRIVESHAFT BEARING AND SEAL ASSEMBLY

[75] Inventor: John L. Groat, Canton, Mich.

[73] Assignee: Ford Motor Company, Dearborn, Mich.

[21] Appl. No.: 228,207

[22] Filed: Aug. 4, 1988

[51] Int. Cl.$^4$ .............................................. B62D 1/16
[52] U.S. Cl. ..................................... 280/779; 280/780
[58] Field of Search ............................... 280/779, 780

[56] References Cited

U.S. PATENT DOCUMENTS

| | | | |
|---|---|---|---|
| 2,467,099 | 4/1949 | Smith | 384/484 |
| 2,643,164 | 6/1953 | Maas | 384/484 |
| 2,990,220 | 6/1961 | Malone | 384/484 |
| 3,140,129 | 7/1964 | Koss | 384/477 |
| 4,185,880 | 1/1980 | Shiomi et al. | 384/498 |
| 4,608,881 | 9/1986 | Tanoue | 280/779 |
| 4,708,499 | 11/1987 | Loser et al. | 384/539 |

FOREIGN PATENT DOCUMENTS 20506 2/1983 Japan .................................... 280/779

Primary Examiner—Kenneth R. Rice
Attorney, Agent, or Firm—Jerome R. Drouillard; Roger L. May

[57] ABSTRACT

A bearing and seal assembly for supporting a steering driveshaft of an automotive vehicle includes a rolling bearing for accepting the driveshaft, with the bearing being adjustable to accommodate variations of the diameter of the driveshaft, and a driveshaft seal assembly for excluding environmental contamination from entering the rolling bearing from outside the passenger compartment of the vehicle. The bearing and seal assembly includes a housing comprising a first cavity in which the rolling bearing is housed and a second cavity in which at least a portion of the seal assembly is housed.

18 Claims, 2 Drawing Sheets

AUTOMOTIVE STEERING DRIVESHAFT BEARING AND SEAL ASSEMBLY

BACKGROUND OF THE INVENTION

This invention relates to a bearing assembly for supporting a steering driveshaft for a vehicle.

DISCLOSURE INFORMATION

Automotive vehicles typically employ a driveshaft between the steering column and steering gear for the purpose of transmitting rotational motion of the steering wheel to the steering gear. Such driveshafts are commonly connected with the steering gear and steering column by means of universal joints or other types of flexible joints. In the event that it is necessary to place such a joint in the middle region of the driveshaft, it is necessary to provide a support located somewhere near the midpoint of the shaft. A bearing and seal assembly according to the present invention is intended to provide such support while sealing the bearing against environmental contamination. This assembly also excludes such environmental contamination, including noise, from the passenger compartment of the vehicle.

The present bearing and seal assembly is intended to provide a vibration-free, rotatable, sealed support for a steering driveshaft, with the further capability of accommodating slight irregularities in the outside diameter of the shaft.

U.S. Pat. Nos. 2,467,099; 2,643,164; 2,990,220; and 3,140,129 each disclose a combination bearing and seal assembly for a shaft. None of these bearing and seal assemblies, however, is capable of accommodating a shaft having a varying diameter. Such capability is important because although it is possible to produce a driveshaft having precisely controlled outside diameter, such production usually requires the utilization of more expensive machining processes e.g., grinding, to accomplish a precise control of the diameter of the shaft, and this results in undue expense.

U.S. Pat. No. 4,185,880 and 4,708,499 disclose bearing assemblies for supporting automotive steering column driveshafts which cannot accommodate driveshafts of varying diameter.

It is an object of the present invention to provide an automotive steering driveshaft bearing and seal assembly which not only supports a driveshaft but which also excludes environmental factors such as road noise and contamination from the passenger compartment and the bearing assembly itself.

It is a further object of the present invention to provide a steering driveshaft bearing and seal assembly which will accommodate minor angular misalignments occurring between the driveshaft and the port through he vehicle's dash panel in which the bearing is mounted.

It is yet a further object of the present invention to provide a steering driveshaft bearing and seal assembly which accommodates driveshafts having minor variations in their outer diameter.

It is an advantage of the present invention that a steering driveshaft bearing and seal assembly according to this invention may be applied with less expensive driveshafts produced by processes such as cold forming, or welding rather than by more expensive processes such as those utilizing a grinding operation to determine the finished outer diameter of the shaft.

Other objects, features and advantages of the present invention will become apparent to those skilled in the art upon reading this disclosure.

SUMMARY OF THE DISCLOSURE

In accordance with the present invention, a steering driveshaft bearing and seal assembly, which is suitable for use in an automotive steering system in conjunction with a steering column and a steering gear, comprises a bearing for accepting the driveshaft, with the bearing being adjustable to accommodate variations in the diameter of the driveshaft, and a driveshaft seal assembly for excluding environmental contamination from entering the bearing. The driveshaft seal assembly is engaged with the driveshaft and the seal assembly and bearing are mounted within a housing comprising a first cavity in which the bearing is housed and a second cavity in which at least a portion of the seal assembly is housed. The bearing may comprise a rolling bearing with a plurality of rollers which are adapted for direct rolling contact with the driveshaft, with the rollers being caged within an expandable retainer or outer race such that variations in the outside diameter of the driveshaft may be accommodated.

The bearing assembly's housing may comprise an elastomeric material having a generally convex outer surface in the axial region corresponding with the location of the rolling bearing. The bearing housing is attached to the vehicle by means of a first bearing mounting bracket attached to the chassis of the vehicle and a second bearing mounting bracket for maintaining the assembly's housing in contact with the first bracket, with each of the mounting brackets having a concave surface for contacting the convex surface of the housing. The combination of the concave surfaces of the first and second bearing mounting brackets and the convex surface of the assembly housing assures that the outer surface of the housing will be maintained in sealing contact with the first mounting bracket when the bearing assembly has been installed in a vehicle. Such installation may occur at a variety of times during the assembly of the vehicle. Also, the bearing and its mounting brackets may be assembled into the vehicle at different times. For example, the first mounting bracket may comprise a component part of an environmental isolator applied to the passenger compartment side of the dash panel of the vehicle and, as such, the first mounting bracket may be assembled into the vehicle at a very early stage of the vehicle's construction.

As noted previously, the bearing assembly according to the present invention has the capability of accommodating steering drive shafts of varying diameter. This results from the use of a roller bearing having an expandable cylindrical retainer, with the retainer having one or more discontinuities in its wall such that the retainer may expand to accommodate such varying diameters. Such expansion is permitted when the bearing housing is constructed of an elastomeric material which exerts a radially inward compressive force upon the retainer. Construction of the bearing housing from elastomeric material will further allow the housing to comprise a driveshaft lip seal for excluding contamination from entering the rolling bearing from inside the passenger compartment of the vehicle.

BRIEF DESCRIPTION OF THE DRAWINGS

FIG. 4 shows typical construction details of the assembly, including its mounting provisions.

DESCRIPTION OF THE PREFERRED EMBODIMENTS

Figures 1, 4:
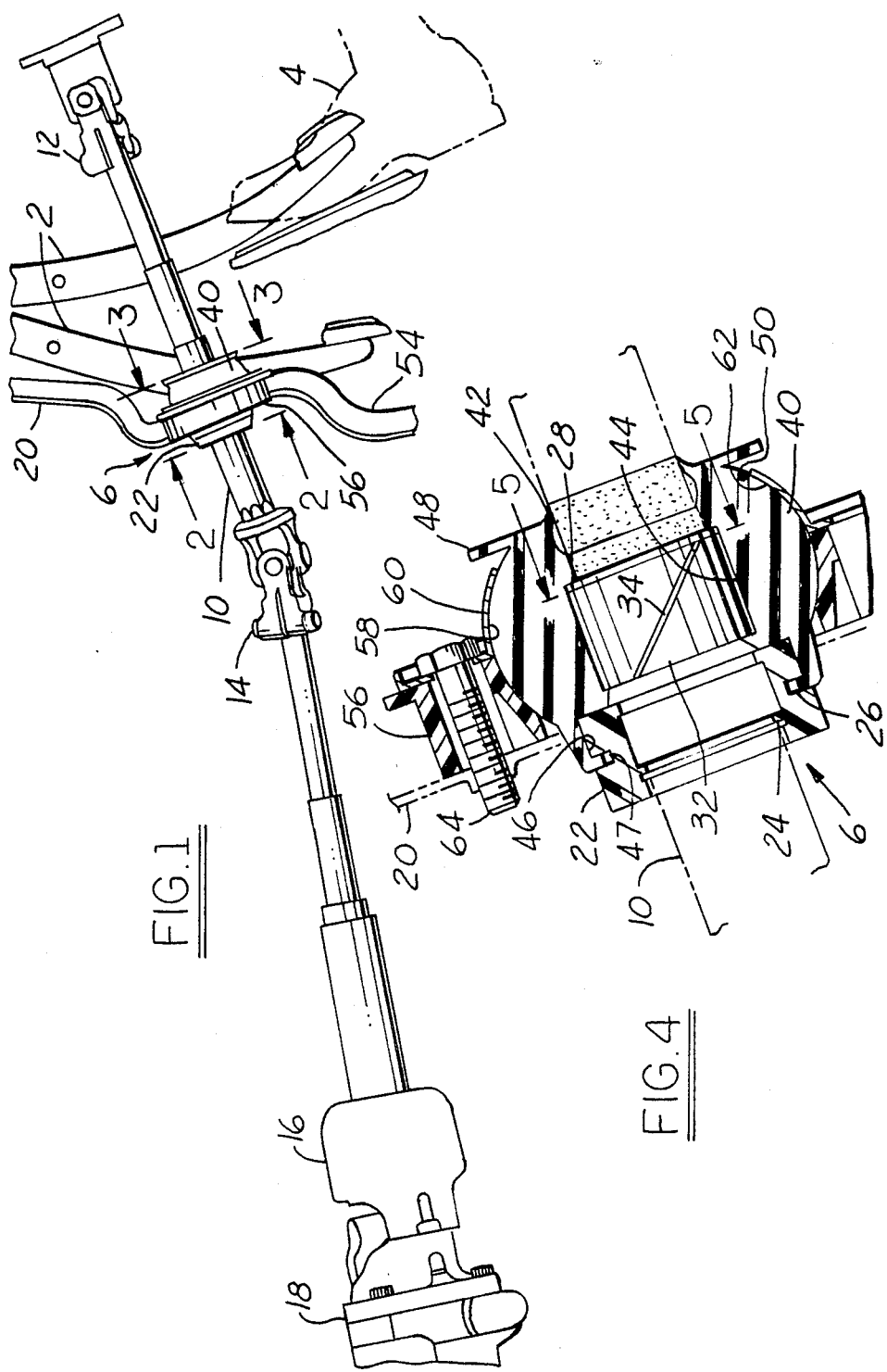
FIG. 1 is a side elevation of a portion of an automotive steering system including a bearing and seal assembly according to the present invention.
FIG. 4 is a cross-sectional view of a bearing assembly according to the present invention taken along the line 4—4 of FIG. 2.

As shown in FIG. 1, bearing and seal assembly 6 according to the present invention is intended to be employed with the driveshaft of an automotive steering system. In typical fashion, a driveshaft extends between steering column 8 and steering gear 18. The driveshaft is suspended at its upper end by upper U-joint 12 and at its lower end by flexible joint 16. Lower U-joint 14 is an intermediate U-joint, which necessitates the support provided by a bearing according to the present invention. As shown in FIG. 1, bearing and seal assembly 6 is mounted to dash panel 20 of the vehicle. The reader is directed to the location of the driver's foot, 4, and hanging pedals, 2, shown in FIG. 1 so as to understand the location of dash panel 20.

Figure 2:
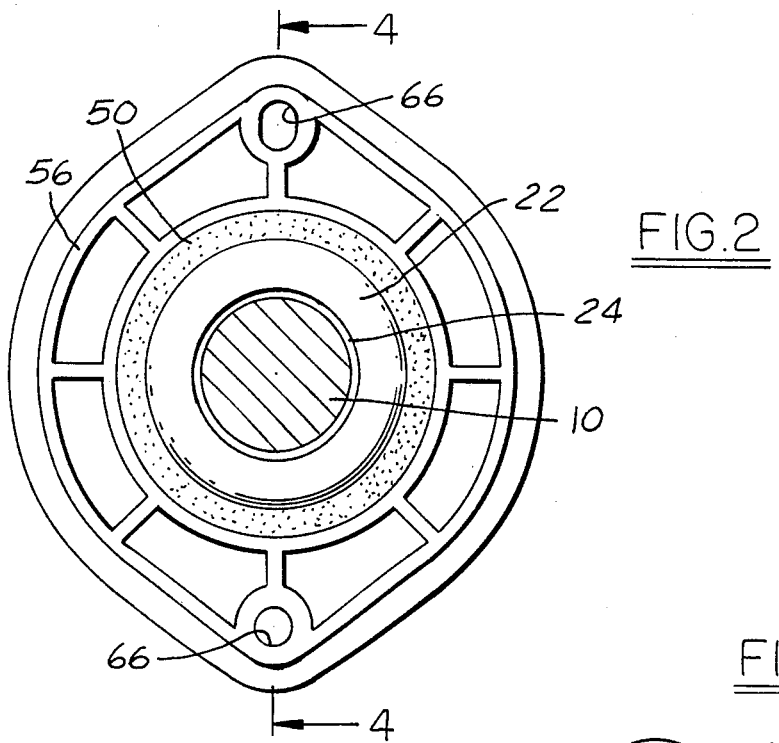
FIG. 2 is an end view o a bearing assembly according to the present invention taken along the line 2—2 of FIG. 1.
Figure 3:
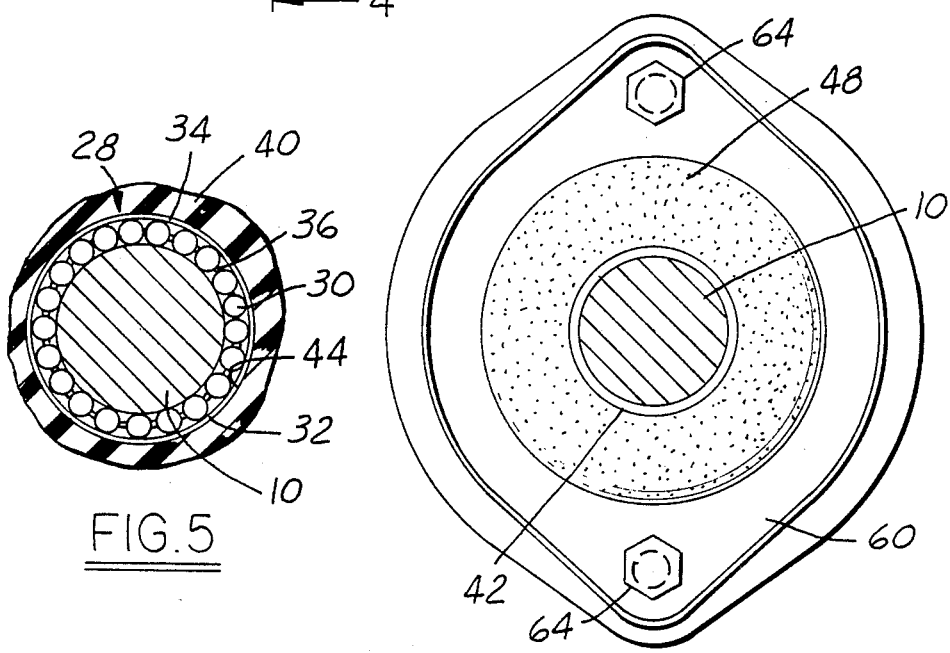
FIG. 3 is an end view of a bearing assembly according to the present invention taken along the line 3—3 of FIG. 1.

Details of the mounting arrangement of the Present bearing and seal assembly are shown in FIGS. 2-4. First mounting bracket 56 (FIG. 2) is attached to dash panel 20 by means of fasteners passing through apertures 66. Mounting bracket 56 is preferably molded of a plastic material such as nylon, polypropylene or other materials known to those skilled in the art and suggested by this disclosure. In any event, first bearing mounting bracket 56 has a concave contact surface, 58, (FIG. 4), which is adapted for the mounting of bearing housing 40 by means of the bearing housing's convex outer surface, 50. Bearing housing 40 preferably comprises an elastomeric material, such as general purpose neoprene, but could be made of other materials known to those skilled in the art and suggested by this disclosure. The bearing housing is maintained in sealing contact with first bearing mounting bracket 56 by means of second mounting bracket 60, which also has a concave contact surface, 62, and which is maintained in contact with convex outer surface 50 of bearing housing 40 by means of two fasteners 64. Second mounting bracket 60 may be constructed of mild steel or other materials known to those skilled in the art to which this invention pertains and which are suggested by this disclosure. Those skilled in the art will further appreciate in view of this disclosure that the precise details of the first and second mounting brackets may be modified to accommodate other types of dash panel structures and steering system locations.

The complementary relationship between the convex and concave outer and inner surfaces of bearing housing 40 and first and second mounting brackets 56 and 60 allows steering driveshaft 10 to assume any one of a plurality of alignment positions with respect to dash panel 20 because bearing housing 40 is adapted to rotate within mounting brackets 56 and 60 within a limited extent. This will allow a bearing and seal according to the present invention to accommodate minor misalignment of the steering driveshaft. Further accommodation is possible if bearing housing 40 is constructed of a compliant elastomeric material. Accordingly, bearing and seal assembly 6 will thereby compensate for minor variations in the production processes which fix the location of dash panel 20 vis-a-vis steering column 8. The capability of producing such accommodation is further enhanced by the fact that the bearing and seal assembly according to the invention allows the bearing and seal assembly to slide axially upon driveshaft 10. Thus, a bearing and seal assembly according to the present invention is unlike the assemblies illustrated in U.S. Pat. Nos. 4,185,880 and 4,708,499, neither of which allow axial movement of the steering shaft with respect to the bearing and seal assembly.

Figure 5:
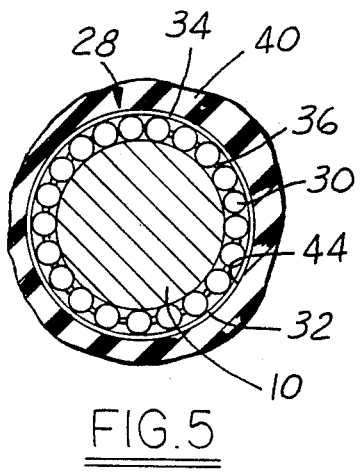
FIG. 5 illustrates a partial lateral cross sectional of a bearing according to the present invention, showing with particularity a plurality of rollers in contact with the steering driveshaft.

FIGS. 4 and 5 detail the construction of the inner portions of a bearing and seal assembly according to the present invention. The usefulness of convex outer surface 50 formed on bearing housing 40 has previously been described. The bearing housing described herein has at least several additional features worthy of note. Accordingly, in order to exclude environmental contamination from outside the passenger compartment of the vehicle, bearing housing 40 comprises a second cavity, 46, with an adjacent annular retention structure, 47, which cooperate to retain driveshaft seal 22 within bearing and seal assembly 6. Seal 22 includes seal lip 24 which rides upon driveshaft 10 and thereby excludes environmental contamination from the interior of the bearing and seal assembly. At the opposite end of the bearing and seal assembly, lip seal 42 excludes contamination originating within the passenger compartment from the interior of the bearing and seal assembly 6. Retaining flange 48, which is adjacent to seal lip 42, serves to retain mounting bracket 60 upon the bearing and seal assembly prior to the insertion of fasteners 64.

FIGS. 4 and 5 illustrate placement of roller bearing 28 within bearing housing 40. As shown in FIG. 5, roller bearing 28 comprises a plurality of rollers, 30, which are position-controlled by cage 36 and which are interposed between the expandable bearing retainer or outer race 32, and shaft 10. Although driveshaft 10 is shown as a solid shaft in FIG. 5, those skilled in the art will appreciate in view of this disclosure that the steering driveshaft could comprise a hollow member as well as the illustrated solid member. As shown in FIG. 4, the convex outer surface of housing 40 generally corresponds to the axial location of roller bearing 28 within the bearing assembly.

As shown with particularity in FIG. 4, bearing retainer 32 is provided with a discontinuity, 34. This discontinuity may comprise any one of a number of techniques known to those skilled in the art to allow expansion of a cylindrical structure with the illustrated discontinuity merely comprising one such expedient. As shown in FIG. 4, discontinuity 34 comprises a diagonal interruption of the wall of bearing retainer 32. Because the discontinuity is diagonally, rather than axially directed, rollers 30 may operate in the vicinity of the discontinuity without undue hindrance. In practice, the dimension of the discontinuity may be set so that an acceptable opening in the retainer wall is achieved with the average expected diameter of driveshaft 10, so that the discontinuity may be allowed to shrink or grow as required by the diameter of the particular driveshaft with which the bearing assembly is employed. It has been determined that the bearing according to the present invention produces acceptable vibration isolation and operates at low noise levels even with the presence of discontinuity 34 because bearing housing 40 exerts a radially inwardly directed compressive force against bearing retainer 32 which serves to maintain rollers 30 in snug contact with driveshaft 10. Those skilled in the art will appreciate in view of this disclosure that other types of rolling bearings will undoubtedly be compatible for use within a bearing and seal assembly as described herein. Those skilled in the art will further appreciate in view of this disclosure that a plain bearing could be employed in an assembly according to the present invention. Such a bearing could comprise a thermoplastic sleeve bearing having a diagonal discontinuity similar to the discontinuity described herein in connection with bearing retainer 32. Nylon or other materials known to those skilled in the art and suggested by this disclosure could be utilized for such a sleeve bearing.

A seal and bearing assembly according to the present invention produces yet additional advantages. The first such advantage resides in the fact that first bearing mounting bracket 56 may be molded as a component part of an environmental isolator pad applied to the passenger compartment side of the dash panel. Accordingly, sound and dust proofing results easily from the tight seal achieved by molding the bearing mounting bracket in place with a sound absorber. Similarly, the sealing contact obtained between concave contact surface 58 of the first mounting bracket and convex outer surface 50 of bearing housing 40 achieves a further isolation of environmental influences from the passenger compartment. As shown in FIG. 1, a bearing assembly according to the present invention may be mounted between two driveshaft U-joints as part of a complete steering shaft assembly. Because, however, a seal and bearing assembly according to the present invention may slide axially upon driveshaft 10, a driveshaft assembly including the present bearing and seal assembly may first be inserted into the vehicle and the bearing then moved to the precise location determined by first bearing mounting bracket 56. Finally, the bearing may be fastened into place by means of the second bearing mounting bracket.

Various modifications and variations will no doubt occur to those skilled in the art to which this invention pertains. All such variations which basically rely upon the teachings with which this disclosure has advanced the art are properly considered within the scope of this invention as defined by the appended claims.

I claim:

1. A bearing assembly for supporting a steering driveshaft of an automotive vehicle, comprising:
    a bearing for accepting said driveshaft, with said bearing being adjustable to accommodate variations in the diameter of said driveshaft;
    a driveshaft seal assembly for excluding environmental contamination from entering said rolling bearing from outside the passenger compartment of said vehicle, with said seal being engaged with said driveshaft; and
    a housing comprising a first cavity in which said rolling bearing is housed and a second cavity in which at least a portion of said seal assembly is housed.

2. A bearing assembly according to claim 2 wherein said bearing comprises a rolling bearing.

3. A bearing assembly according to claim 2 wherein the internal diameter of said rolling bearing is adjustable to accommodate variations in the diameter of said driveshaft.

4. A bearing assembly according to claim 3 wherein said rolling bearing comprises a plurality of rollers which are adapted for direct rolling contact with said driveshaft, with said rollers being caged within an expandable retainer such that variations in the diameter of said driveshaft may be accommodated.

5. A bearing assembly according to claim 1 wherein said housing comprises an elastomeric material.

6. A bearing assembly according to claim 1 wherein said housing has a generally convex outer surface in the axial region corresponding with said rolling bearing.

7. A bearing assembly according to claim 6 further comprising a first bearing mounting bracket attached to the chassis of said automotive vehicle and a second bearing mounting bracket for maintaining said housing in contact with said first mounting bracket, with each of said mounting brackets having a concave surface for contacting said convex surface of said housing.

8. A bearing assembly according to claim 7 wherein said first mounting bracket comprises a component part of an environmental isolator applied to the passenger compartment side of the dash panel of said vehicle.

9. A bearing assembly for supporting a steering driveshaft of an automotive vehicle, comprising:
    a roller bearing for accepting said driveshaft; and
    an elastomeric housing comprising a cavity in which said roller bearing is located, with said roller bearing comprising a plurality of rollers maintained in direct rolling contact with said driveshaft by an expandable cylindrical retainer, with said retainer having one or more discontinuities in its wall such that said retainer and said housing will accommodate driveshafts of varying diameter.

10. A bearing assembly according to claim 9, wherein said elastomeric housing exerts radially inward compressive force upon said retainer.

11. A bearing assembly for supporting a steering driveshaft of an automotive vehicle, comprising:
    a rolling bearing for accepting said driveshaft, said rolling bearing being adjustable to accommodate variations in the diameter of said driveshaft;
    a driveshaft seal assembly for excluding environmental contamination from entering said rolling bearing from outside the passenger compartment of said vehicle, with said seal being engaged with said driveshaft;
    a housing comprising a first generally annular cavity in which said rolling bearing is housed and a second generally annular cavity in which a portion of said seal assembly is housed, with the outer surface of said housing having a generally convex surface in the axial region corresponding with said rolling bearing; and
    a first bearing mounting bracket attached to the chassis of said automotive vehicle and a second bearing mounting bracket for maintaining said housing in contact with said first mounting bracket, with each of said mounting brackets having a concave surface for contacting said convex surface of said housing, whereby the outer surface of said housing will be maintained in sealing contact with said first mounting bracket when said bearing assembly has been installed in said vehicle.

12. A bearing assembly according to claim 11 wherein said housing further comprises an integral driveshaft seal lip for excluding contamination from entering said rolling bearing from inside the passenger compartment of said vehicle, with said seal being engaged with said driveshaft.

13. A bearing assembly according to claim 11 wherein said housing comprises an elastomeric material.

14. A bearing assembly according to claim 11 wherein said first mounting bracket is integral with an environmental isolator applied to the passenger compartment side of the dash panel of said vehicle.

15. A steering system for an automotive vehicle, comprising:
   a steering column;
   a steering gear; and
   a steering driveshaft extending between said steering column and said steering gear, with said steering driveshaft being supported by a bearing assembly comprising:
   a rolling bearing for accepting said driveshaft, said rolling bearing being adjustable to accommodate variations in the diameter of said driveshaft;
   a driveshaft seal assembly for excluding environmental contamination from entering said rolling bearing from outside the passenger compartment of said vehicle, with said seal being engaged with said driveshaft;
   a housing comprising a first generally annular cavity in which said rolling bearing is housed and a second generally annular cavity in which a portion of said seal assembly is housed, with the outer surface of said housing having a generally convex surface in the axial region corresponding with said rolling bearing; and
   a first bearing mounting bracket attached to the chassis of said automotive vehicle and a second bearing mounting bracket for maintaining said housing in contact with said first mounting bracket, with each of said mounting brackets having a concave surface for contacting said convex surface of said housing, whereby the outer surface of said housing will be maintained in sealing contact with said first mounting bracket when said bearing assembly has been installed in said vehicle.

16. A steering system according to claim 15 wherein said housing further comprises an integral driveshaft seal lip for extending contamination from entering said rolling bearing from inside the passenger compartment of said vehicle, with said seal being engaged with said driveshaft.

17. A steering system according to claim 15 wherein said first mounting bracket is integral with an environmental isolator applied to the passenger compartment side of the dash panel of said vehicle.

18. A steering system according to claim 15 wherein said housing comprises an elastomeric material.

* * * * *